(12) United States Patent
Yokota

(10) Patent No.: US 6,604,049 B2
(45) Date of Patent: Aug. 5, 2003

(54) SPATIAL INFORMATION USING SYSTEM, SYSTEM FOR OBTAINING INFORMATION, AND SERVER SYSTEM

(75) Inventor: Sohichi Yokota, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/960,156

(22) Filed: Sep. 21, 2001

(65) Prior Publication Data

US 2002/0045988 A1 Apr. 18, 2002

(30) Foreign Application Priority Data

Sep. 25, 2000 (JP) ........................................ 2000-290065

(51) Int. Cl.[7] .............................................. G01C 21/00
(52) U.S. Cl. ........................ 701/213; 701/200; 340/988; 342/357.12
(58) Field of Search ................................. 701/200, 213, 701/214, 215; 342/357.01, 357.06, 357.09, 357.12; 340/988

(56) References Cited

U.S. PATENT DOCUMENTS 5,568,152 A * 10/1996 Janky et al. ................ 342/357

* cited by examiner

*Primary Examiner*—Yonel Beaulieu
(74) *Attorney, Agent, or Firm*—Thomas A. Beck; Louis Herzberg

(57) ABSTRACT

A system using spatial information utilizing a client apparatus carried by a movable body and possessing a central system for providing predetermined information to the client apparatus. The client apparatus consists of a camera for obtaining image information and a positional information obtaining device for obtaining positional information about the location of the client apparatus from a GPS satellite. The apparatus sends the obtained image information obtained and positional information to a central system; and the central system extracts additional information about an object contained in the image information based on the image information and the positional information received and sends the additional information to the client apparatus.

7 Claims, 8 Drawing Sheets

FIG.5a

OBJECT INFORMATION REQUEST

| DATA TYPE | POSITION | DIRECTION | ANGLE | TIME STAMP | USER ID | IMAGE FORMAT | IMAGE |
|---|---|---|---|---|---|---|---|
| 101 | 102 | 103 | 104 | 105 | 106 | 107 | 108 |

— GENERAL INFORMATION REQUEST
— GENERAL / OWN INFORMATION REQUEST

FIG.5b

DETAILED OBJECT INFORMATION REQUEST

| DATA TYPE | USER ID | IMAGE ID | CURSOR POSITION (IN IMAGE) |
|---|---|---|---|
| 101 | 106 | 109 | 110 |

FIG.5c

OWN INFORMATION STORE REQUEST

| DATA TYPE | POSITION | DIRECTION | ANGLE | TIME STAMP | USER ID | IMAGE |
|---|---|---|---|---|---|---|
| 101 | 102 | 103 | 104 | 105 | 106 | 107 |

IMAGE 108

FIG.5d

OWN INFORMATION ADD REQUEST

| DATA TYPE | POSITION | DIRECTION | ANGLE | TIME STAMP | USER ID | IMAGE ID | CURSOR POSITION (IN IMAGE) AND STORE INFORMATION (TEXT, AUDIO, IMAGE) |
|---|---|---|---|---|---|---|---|
| 101 | 102 | 103 | 104 | 105 | 106 | 109 | 111 |

FIG.6a COMBINATION OF MATCHING IMAGE AND OBJECT INFORMATION

| DATA TYPE | POSITION | DIRECTION | ANGLE | TIME STAMP | USER ID | IMAGE ID | IMAGE FORMAT | COMBINE DAMAGE (IMAGE + OBJECT INFORMATION) |
|---|---|---|---|---|---|---|---|---|
| 121 | 122 | 123 | 124 | 125 | 126 | 127 | 128 | 129 |

FIG.6b DETAILED OBJECT INFORMATION RESPONSE

| DATA TYPE | USER ID | IMAGE ID | DETAILED INFORMATION (TEXT, AUDIO, WEB INFORMATION) |
|---|---|---|---|
| 121 | 126 | 127 | 130 |

FIG.6c ACCEPTANCE OF OWN INFORMATION STORAGE REQUEST

| DATA TYPE | POSITION | DIRECTION | ANGLE | TIME STAMP | USER ID | IMAGE ID | IMAGE FORMAT | STORED IMAGE |
|---|---|---|---|---|---|---|---|---|
| 121 | 122 | 123 | 124 | 125 | 126 | 127 | 128 | 131 |

FIG.7a    IMAGE DATABASE STORAGE FORMAT

| POSITION | DIRECTION | ANGLE | TIME STAMP | IMAGE ID | IMAGE ATTRIBUTE | IMAGE |
|---|---|---|---|---|---|---|
| 141 | 142 | 143 | 144 | 145 | 146 | 147 |

IMAGE ATTRIBUTE (146):
- FORMAT
- SIZE
- GENERAL / PERSONAL

FIG.7b    OBJECT INFORMATION DATABASE STORAGE FORMAT

| IMAGE ID | OBJECT POSITION(1) | OBJECT ID (1) | OBJECT POSITION(2) | OBJECT ID (2) | OBJECT POSITION(n) | OBJECT ID (n) |
|---|---|---|---|---|---|---|
| 151 | 152 | 153 | 154 | 155 | 156 | 157 |

| OBJECT ID | OBJECT INFORMATION (TEXT, AUDIO, IMAGE, LINK TO WEB SITE) |
|---|---|
| 158 | 159 |

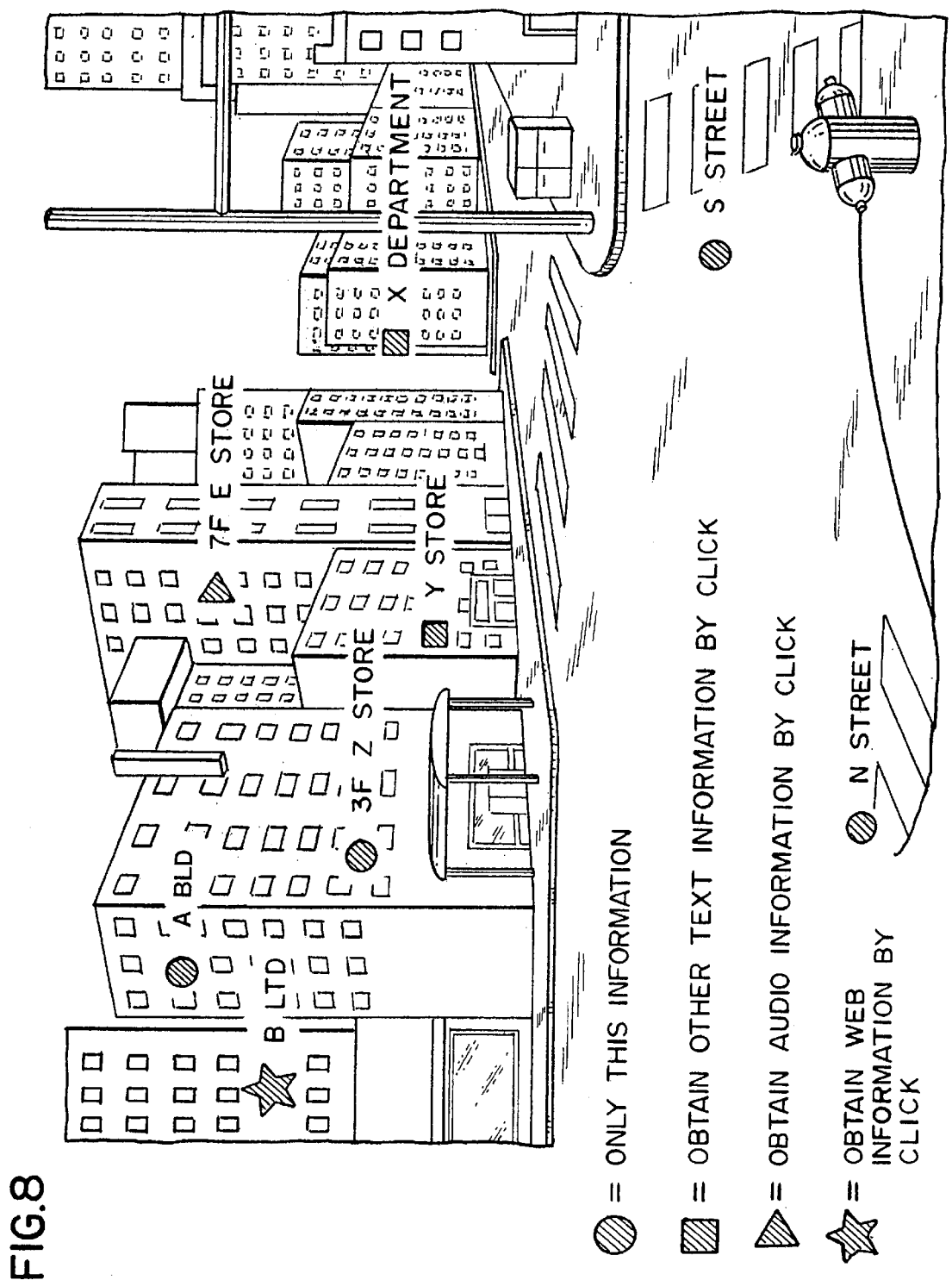

SPATIAL INFORMATION USING SYSTEM, SYSTEM FOR OBTAINING INFORMATION, AND SERVER SYSTEM

FIELD OF THE INVENTION

The present invention relates to a spatial information using system and in particular to a space information using system for providing image information regarding a position at which the image information is obtained.

BACKGROUND

The Global Positioning System (GPS) uses information sent from 24 satellites (operated by the United States Department of National Defense) orbiting the earth to measure the positional relationship between a receiver and each satellite to calculate the latitude and longitude of the position of the receiver. While a typical commercial use of the GPS is a car navigation system, devices of a new concept using the GPS have become available recently.

A typical example of this is a camera including a GPS unit (GPS camera). The GPS camera contains a GPS receiver and a direction angle sensor, for example, and records the position (latitude and longitude) and direction angle (the direction of a shot object) at the time of shooting to allow image information as well as the location and the photographed part of the photographed object to be displayed in concrete form. Examples of applications of the GPS camera include academic studies, environmental investigations, and photorecording of facilities and sites. For example, Published Unexamined Patent Application No. 8-88825 discloses a method for editing images of engineering works to indicate the progress of construction by using a GPS camera. Recently, technologies have been proposed that provide positional information services to a movable body and/or a third party through various media such as a cellular phone service, electronic mail, and facsimiles by combining a microminiature GPS unit and a cellular phone.

By using a conventional GPS camera, for example, a given image can be recorded and the recorded image can be effectively used as a resource. In addition, using and storing additional information such as positional information, date and time, information on a photographed part and angle facilitates accesses to the image record. However, these technologies using a GPS camera are not enough to provide an opportunity to derive other information about a photographed object.

On the other hand, a pedestrian or a user of a motor vehicle can obtain information about his/her surroundings in a limited range (the name and service of buildings and stores) and retrieve given information by accurately specifying an object of interest and accessing by radio a network such as the Internet through a device such as the above-mentioned cellular phone including a GPS unit. However, the prior arts involve many tasks by the user for selection and determination and require a significant amount of intervention of the user for specifying the object. In addition, they provide poor real-time performance and are not practicable in terms of ease of use.

One approach is to structuring geographical information as geometric information consisting of shape information and positional information to create a database. In that application, a scenario is provided in which when a user having a handheld device sends a question, "How can I get to point B from point A by following a real road communication?", for example, to a communication server through a mobile communication system, navigation information is sent back onto the screen of the handheld device as the result. However, this approach in this publication provides only geographic information (a map, for example) based solely on geometric information to the user. It is difficult for this approach to provide other additional information. In particular, the publication does not describe any technology for holding image information (landscape information) itself captured by a camera, for example, which contains a large amount of data and is difficult to be structured, in a database.

SUMMARY OF THE INVENTION

The present invention solves these technical problems. In one aspect it provides methods, apparatus and systems to allow a user moving in the open air to obtain information about an object in real time that the user wants to obtain.

It is another aspect of the present invention to allow the user who are moving in open air to add the user's own annotation (additional information) to image shot by the user and to store it in a remote server.

An example embodiment of the present invention is characterized by a spatial information using system comprising a client apparatus carried by a movable body and a central system for providing predetermined information to the client apparatus, wherein: the client apparatus comprises a camera for obtaining image information and a positional information obtaining device for obtaining positional information about the client apparatus and sends the obtained image information obtained and positional information to the central system; and the central system extracts additional information about an object contained in the image information based on the image information and the positional information received and sends the additional information to the client apparatus.

BRIEF DESCRIPTION OF THE DRAWINGS

These and other aspects, features, and advantages of the present invention will become apparent upon further consideration of the following detailed description of the invention when read in conjunction with the drawing figures, in which:

FIGS. 5a to 5d show the structures of data sent from the client apparatus 10 to the central system 30;

FIGS. 6a to 6c show the structure of data sent from the central system 30 to the client apparatus 10;

FIGS. 7a and 7b shows database structure stored in image databases 33, 35 and object information databases 34, 36; and FIG. 8 shows an example of a combined image actually displayed on the display device 13 of the client apparatus 10.

DESCRIPTION OF SYMBOLS

Figure 1:
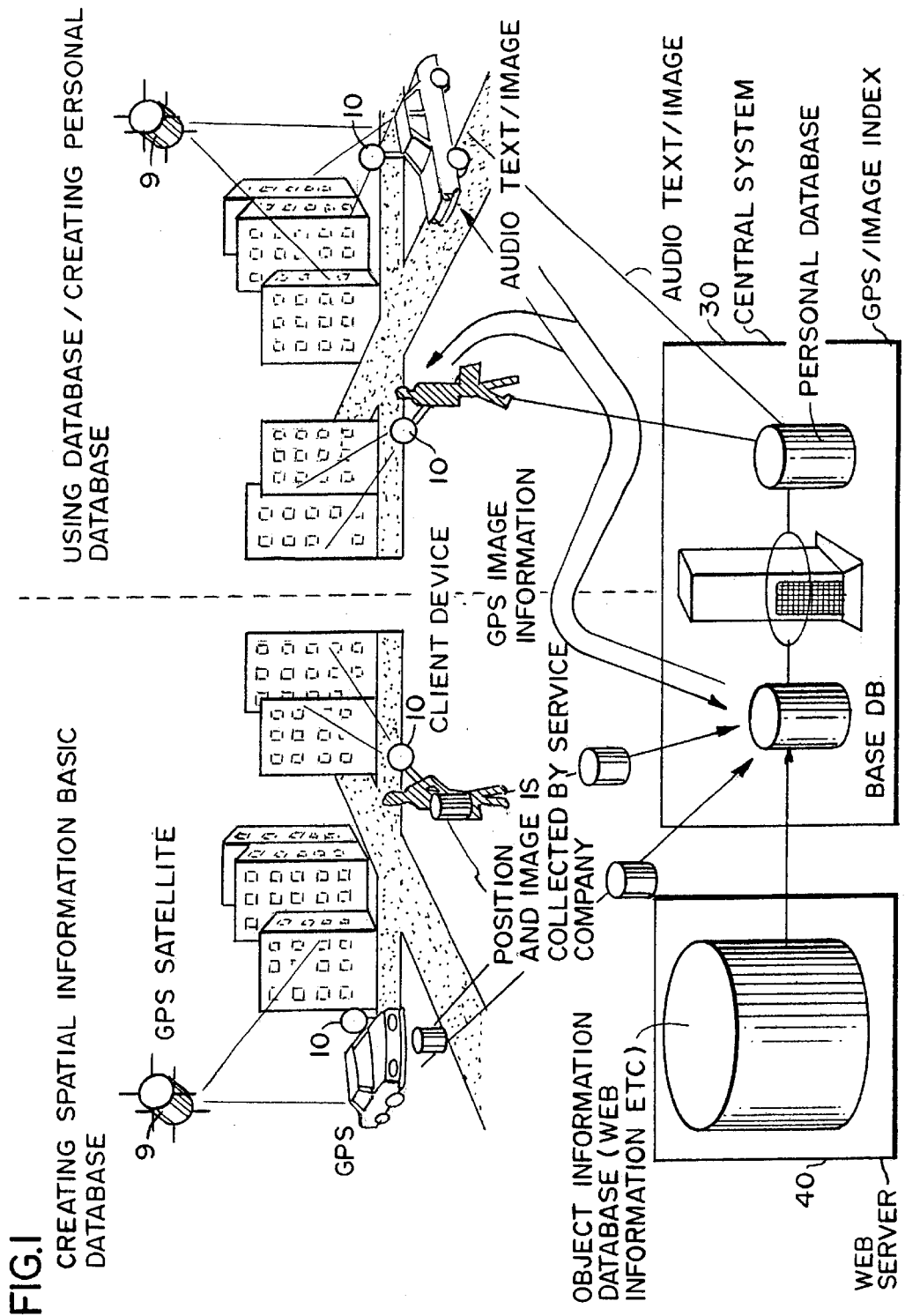
FIG. 1 is an explanatory diagram showing an overview of a spatial information using system according to an embodiment of the present invention.

9 . . . GPS satellite
10 . . . Client apparatus

11 . . . Processing section
12 . . . Camera
13 . . . Display device
14 . . . Audio input/output device
15 . . . Pointing device
16 . . . Text input device
17 . . . Main-body frame
18 . . . Battery
19 . . . Antenna
21 . . . Microprocessor
22 . . . GPS receiver
23 . . . Direction sensor
24 . . . Angle sensor
25 . . . Memory
26 . . . Communication device
30 . . . Central system
31 . . . Communication device
32 . . . Server
33 . . . Image database (for general use)
34 . . . Object information database (for general use)
35 . . . Image database (for personal use)
36 . . . Object information database (for personal use)
40 . . . Web server

DETAILED DESCRIPTION OF THE INVENTION

The present invention provides a spatial information using system. An example embodiment includes: a client apparatus carried by a movable body and a central system for providing predetermined information to the client apparatus, wherein: the client apparatus comprises a camera for obtaining image information and a positional information obtaining device for obtaining positional information about the client apparatus and sends the obtained image information obtained and positional information to the central system; and the central system extracts additional information about an object contained in the image information based on the image information and the positional information received and sends the additional information to the client apparatus.

The central system may extract stored image information best matching the received image information from stored information based on the received positional information and detect the additional information based on attribute information linked to the extracted stored image information. The term "best matching" does not necessarily means that stored image information completely matches the received image information. Instead, stored image that approximately matches the received image information is extracted by using a predetermined pattern matching method.

The central system may be characterized by detecting the additional information and detailed information, which will be described below, from a Web server connected to a network.

It may be advantageous that the client apparatus selects particular additional information from the sent additional information and sends notification that the additional information is selected to the central system and the central system sends detailed information corresponding to the additional information to the client apparatus, thereby allowing the user of the client apparatus to obtain further detailed information.

Viewing from another aspect, the present invention also provides a spatial information using system. In an example embodiment the system includes: a client apparatus carried by a movable body and a central system for processing predetermined information created by the client apparatus, wherein: the client apparatus comprises image information obtaining means such as a camera for obtaining image information, positional information obtaining means such as a GPS receiver for obtaining positional information about the client apparatus, additional information generation means for generating additional information such as a note to the image information, and sending means for sending the obtained image information, the positional information obtained by the positional information obtaining means, and the additional information generated by the additional information generation means to the central system; and the central system comprises receiving means for receiving the sent image information, positional information, and additional information and storage means for storing the received image information, positional information, and additional information.

The additional information generation means in the client apparatus may generate audio information and/or text information as additional information; and the storage means in the central system may store the audio information and/or the text information generated by the additional information generation means by associating the audio information and/or the text information with the image information. In particular, the image information may be identified by an image ID, each object contained in the image information may be identified by an object ID, and object information such as text, audio information, an image, a link to a Web site may be stored for each object ID.

Viewing from another aspect, the present invention is characterized by an information obtaining apparatus comprising: image information capturing means for shooting a landscape to capture image information; positional information identifying means for identifying the position of the image information obtaining means at the time when shooting is performed by the image information capturing means; sending means for sending the captured image information and information about the identified position to a server; receiving means for receiving, from the server, additional information about a predetermined object contained in the landscape captured by the image information capturing means; and output means for outputting the received additional information. "The time when the shooting is performed" is not necessarily the exact time at which the shooting is actually performed.

It is generally advantageous that the information obtaining apparatus further comprises detection means, which is constituted by a direction sensor, angle sensor, or the like, for detecting the direction and/or angle at which the image information capturing means is aimed when shooting is performed by the image information capturing means; wherein the sending means sends information about the direction and/or angle detected by the detection means, thereby facilitating the identification of the storage image information in performing pattern matching.

The receiving means may be characterized in that it receives said additional information together with predetermined image information to which said additional information is added, thus eliminating time and effort required for adding additional information to the image information in the information obtaining apparatus and the server. The image information to which the additional information is added may be an image captured by the information obtaining apparatus or may be best matching image information pre-stored in a database. The addition of the additional information to the image information may be implemented by storing the captured image information in the information obtaining apparatus and obtaining only the additional information to add it to the image information.

The present invention may be further characterized by an information obtaining apparatus further comprising: display means for displaying the predetermined image and the additional information received by the receiving means; and selection means for selecting particular additional information from the displayed additional information; wherein the sending means sends information about the selected particular additional information to the server and the receiving means receives detailed information about the particular additional information from the server.

The information obtaining apparatus to which the present invention is applied comprises a camera for shooting a landscape to obtain landscape information; a GPS receiver for identifying the position of the information obtaining apparatus based on a signal obtained from a GPS satellite; and a communication device for sending the landscape information obtained by the camera and information about the position of the information obtaining apparatus identified by the GPS receiver, wherein the communication device receives additional information about an object contained in the sent landscape information.

The information obtaining apparatus may be characterized in that it further comprises a display device for displaying image information based on the landscape information and the additional information received by the communication device, a pointing device for selecting particular additional information from the additional information displayed by the display device; wherein the communication device sends information about the particular additional information selected by the pointing device and receives detailed information about the sent information. The implementation of the information obtaining apparatus having these functions may be an apparatus worn by a human user, which is a movable body, or may be an apparatus installed in a motor vehicle, which is also a movable body.

The information obtaining apparatus to which the present invention is applied is also characterized to include: shooting means for shooting a landscape to obtain landscape information; display means for displaying the captured landscape information; specifying means for specifying a particular part contained in the displayed landscape information; additional information input means for inputting a predetermined additional information to be stored as, for example, annotation information for the specified particular part; and sending means for sending the captured landscape information and the input additional information to a server.

The sending means may be characterized in that it sends the landscape information and the additional information to the server with the indication of a request for storing own information as user's own information, thereby allowing the own information to be stored in distinction from other information and the stored information to be retrieved quickly as required.

Viewing from a server system (central system), the server system to which the present invention is applied is characterized by comprising: receiving means for receiving landscape information obtained by a client apparatus from the client apparatus; image storage means for pre-storing a plurality of items of image information; object information storage means for pre-storing object information which is additional information for an object constituting each of the plurality of items of image information stored the image storage means; approximate image information selection means for selecting approximate image information approximating to the received landscape information from the plurality of stored items of image information; and sending means for reading object information corresponding to the selected approximate image information from the object information storage means and sending the read object information to the client apparatus.

The receiving means receives positional information about the client apparatus at the time when the client apparatus obtains the landscape information; the image storage means pre-stores the plurality of items of image information identified by a predetermined positional information; and the approximate image information selection means selects the approximate image information based on the received positional information, thus, advantageously, the approximate image can be quickly selected by using pattern matching, for example.

The sending means may be characterized in that it adds the read object information to the approximate image information selected by the approximate image information selection means and sends the approximate image information and the read object information to the client apparatus.

The sending means may be characterized in that it sends the read object information to the client apparatus by associating the object information with the position of an object constituting the approximate image information. For example, a predetermined function may be communicated to the client apparatus by superimposing text information over an object or by providing a predetermined symbol over or in the vicinity of an object.

The receiving means may be characterized by that it receives specification of the object information sent by the sending means from the client apparatus; and the sending means sends detailed information about the object information specified through the receiving means to the client apparatus.

The server system may be characterized in that it comprises Web server access means for receiving additional information or detailed information corresponding to an object constituting the approximate image information from a Web server via a network. This characteristic is preferable in that it eliminates the need for the server system itself to store all object information and allows enormous up-to-date information to be obtained.

The server system to which the present invention is applied comprises receiving means for receiving landscape information obtained by a client apparatus and additional information about a part constituting the landscape information from the client apparatus; image storage means for storing the received landscape information; and object information storage means for storing the received additional information by retaining a correspondence between the additional information and the landscape information by using an image ID or object ID, for example.

The receiving means receives positional information about the landscape information and the image storage means stores the landscape information together with the positional information received by the receiving means.

Advantageous Embodiments

The present invention will be described in detail with respect to example embodiments shown in the accompanying drawings.

FIG. 1 is an explanatory diagram showing an overview of a spatial information using system according to the present embodiment. As shown in FIG. 1, the system comprises a client apparatus 10 as a information obtaining apparatus carried by a movable body, which may be a human user or motor vehicle, a GPS satellite 9 for sending a signal for calculating the latitude and longitude of the current position of the client apparatus 10, a central system 30 as a server for storing picture information (image information) sent from the client apparatus 10 and providing given additional information and detailed information to the client apparatus 10, and a Web server 40 connected to the Internet for providing various types of information (additional information, detailed information, and the like) about an object.

The client apparatus 10 took along by a human user comprises a GPS receiver, a camera, and other components as will be described below and configured as a headset worn by the user like eyeglasses, for example. The client apparatus 10 installed in a motor vehicle is configured in the form of a GPS receiver or a car navigation system for displaying a map in which a camera is installed. The client apparatus 10 comprises communication means as will be described below and sends spatial image information captured through the camera and positional information obtained through the GPS receiver to the server in the central system 30. The central system 30 uses a pattern matching method to extract video image information that best matches landscape information (image information) sent from the client apparatus 10 from stored video image information (stored image information) to identify an object in the landscape information. The central system 30 obtains the information about this object from the Web server 40 over the Internet, for example, and sent it to the client apparatus 10 that sent the landscape information.

Figure 2:
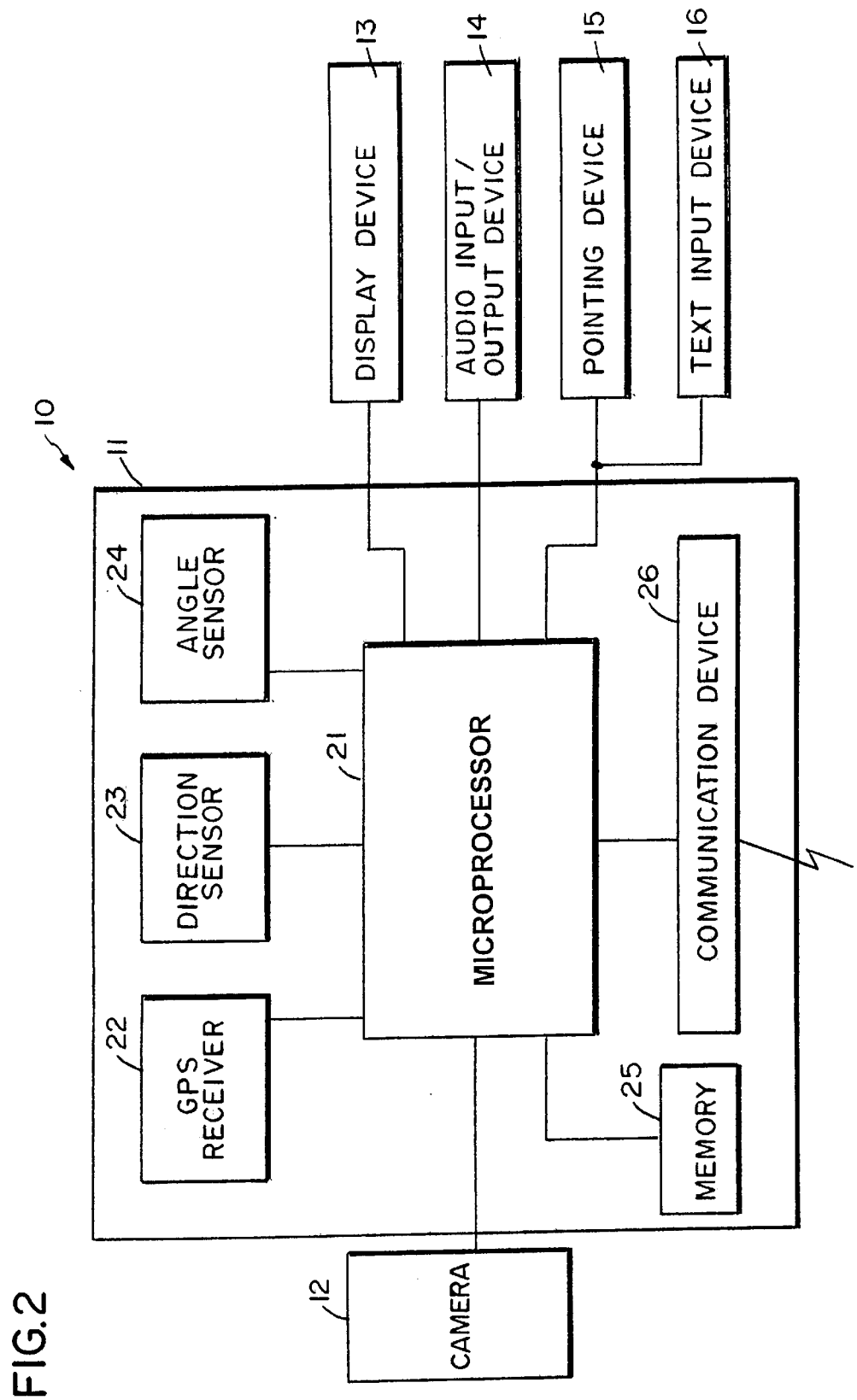
FIG. 2 is a block diagram for explaining a configuration of a client apparatus 10.

FIG. 2 shows a block diagram for explaining a configuration of the client apparatus 10. The client apparatus 10 according to the present embodiment comprises a processing section 11, a camera 12, which is a capturing device such as a digital camera for capturing an image, a display device 13 for displaying the image, an audio input/output device 14 consisting of a microphone, speaker, headphone, and other components, a pointing device 15 as means for selecting a particular part, used for specifying an object, and a text input device 16 for inputting text for specifying a name or other text information.

The processing section 11 comprises a microprocessor 21 for controlling the entire client apparatus 10, a GPS receiver 22 as a positional information obtaining device, a direction sensor 23, an angle sensor 24, memory 25 for storing image information obtained through the camera 12 and measurement information provided by various sensors, and a communication device 26 for sending and receiving information to and from the central system 30 by radio. The camera 12 is a digital still camera which converts a captured optical image into a video image composed by a digital image. The image captured may be a still image or a moving image. The display device 13 in an implementation worn by a human user may be a device that is configured so as to optically enlarge an image on a small liquid-crystal-display (LCD) panel, for example, to form a large picture plane equivalent to a large screen when worn by the user like eyeglasses. The display device in an implementation installed in a motor vehicle may be an LCD used in a car navigation system. The audio input/output device 14 may use a headphone or loudspeaker, for example, to output sound and use a microphone to input sound. As the pointing device 15, a device may be used that can catch eye movement (movement of the pupils) of the user through a sensor (eye tracking sensor or the like) to allow the user select a particular portion in a certain display area which the user want to point to by fixing his/her eyes on that particular portion and nictitating. The text input device 16 may be a key pad equivalent to those used in a mobile device such as a Personal Digital Assistants (PDA) and cellular phone, for example.

The GPS receiver 22 used in the processing section 11 comprises an antenna section and a signal processing section, which are not shown, and calculates the latitude and longitude of the client apparatus 10 based on information about the position (orbit) of GPS satellites 9 acquired from four GPS satellites 9, for example, and the signal propagation distance from the GPS satellites 9 to the GPS receiver 22. However, the measurement by only the GPS may provide positional information having an error ranging from several tens to several hundred meters. An error of this order would cause no problem if the device is used in a moving motor vehicle because it moves in a moment of time. However, the error is not fully negligible when the device is worn by a walking human user. Therefore, the client apparatus 10 according to the embodiment corrects errors by using a differential GPS. The differential GPS corrects errors with signals from GPS base stations disposed nationwide. This differential capability can reduce an error to approximately 2 to 5 m.

The direction sensor 23 may be a magnetic sensor, for example. The direction sensor 23 using a magnetic sensor may sense terrestrial magnetism (magnetic flux lines running along the North-South axis of the earth) through two pairs of coils wound orthogonally to each other in the interior of the sensor and a magnetoresistive (MR) element disposed in the middle of them to determine and output a direction. The angle sensor 24 may be an inclination angle sensor detecting the inclination of an object using a micro-machining technology, for example. The micro-machining technology uses a semiconductor manufacturing process to form a miniature mechanism of micrometers on a silicon wafer, allowing an inclination as slight as approximately 0.1 degrees to be detected.

The microprocessor 21 uses the memory 25 to display an image captured through the camera 12 and accepts operations on input means such as the pointing device 15 and text input device 16 and information such as a position and angle provided from the GPS receiver 22, direction sensor 23, and angle sensor 24 to perform processes required for the system. The memory 25 stores information required for processes by the microprocessor 21 and image information obtained through the camera 12 and other information. The communication device 26 controls the transmission of image data and information obtained through the sensors to the central system 30 under the control of the microprocessor 21 and performs processes for receiving informational data sent from the central system 30.

Figure 3:
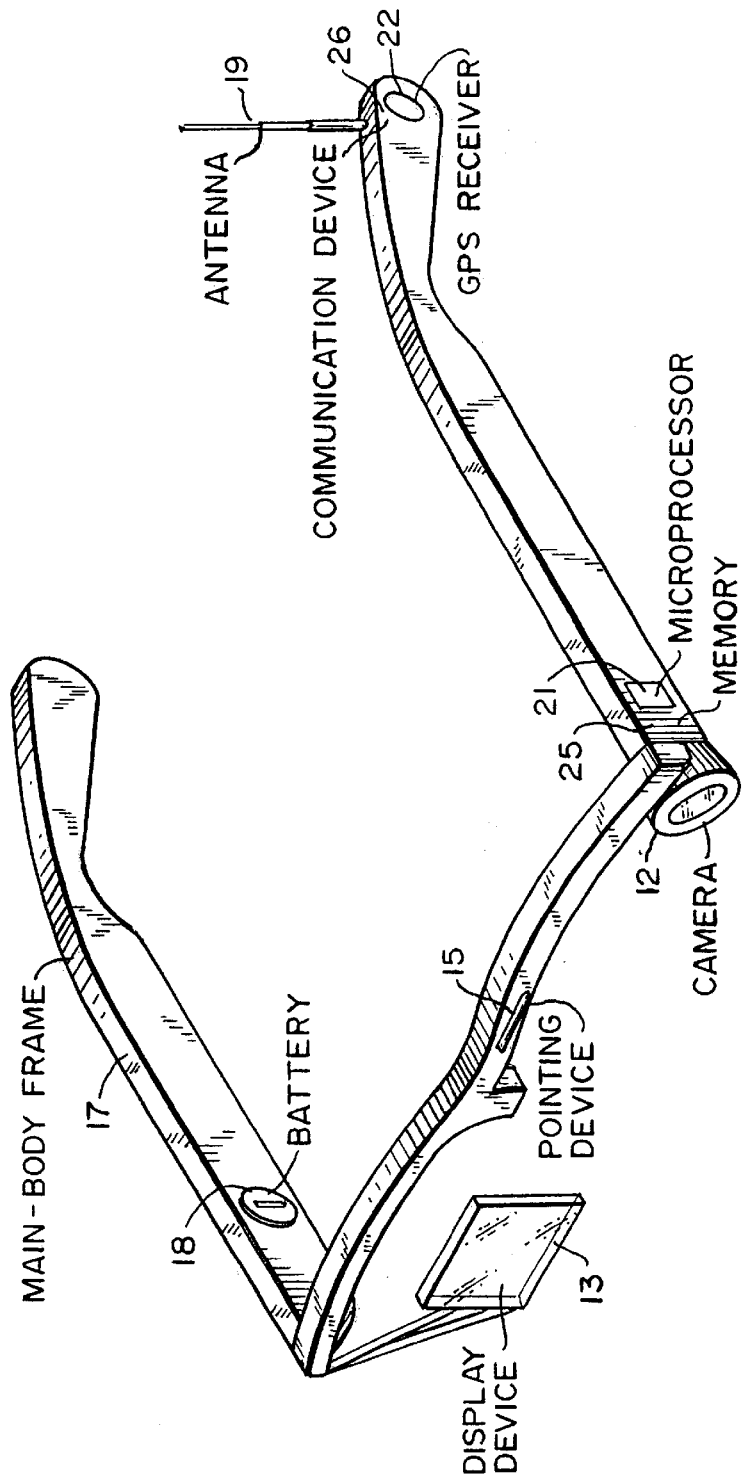
FIG. 3 shows an example of the client apparatus 10 worn by a human user.

FIG. 3 shows an example of the client apparatus 10 worn by a human user. In the example shown in FIG. 3, the units for accomplishing the functions shown in the block diagram in FIG. 2 are disposed on the main-body frame 17 similar to the frame of eyeglasses. Also provided in the frame 17 is a battery 18 for driving the client apparatus 10. For example, the communication device 26 is provided on one side of the main-body frame 17 together with an antenna 19. The antenna 19 or another antenna receives a signal from a GPS satellite 9 and provide it to the GPS receiver 22. The camera 12 is disposed in the vicinity of the position of the human user's eyes so that the direction of the user's line of sight to substantially aligns with an image to be captured. The direction sensor 23 and angle sensor 24 are provided in the vicinity of the camera 12 so that an imaged object can be identified more accurately by determining the direction and angle of the camera 12 more accurately. Furthermore, the display device 13 is provided in the position of the human user's eyes and the eye tracking sensor mentioned earlier is also provided and acts as the pointing device 15.

Figure 4:
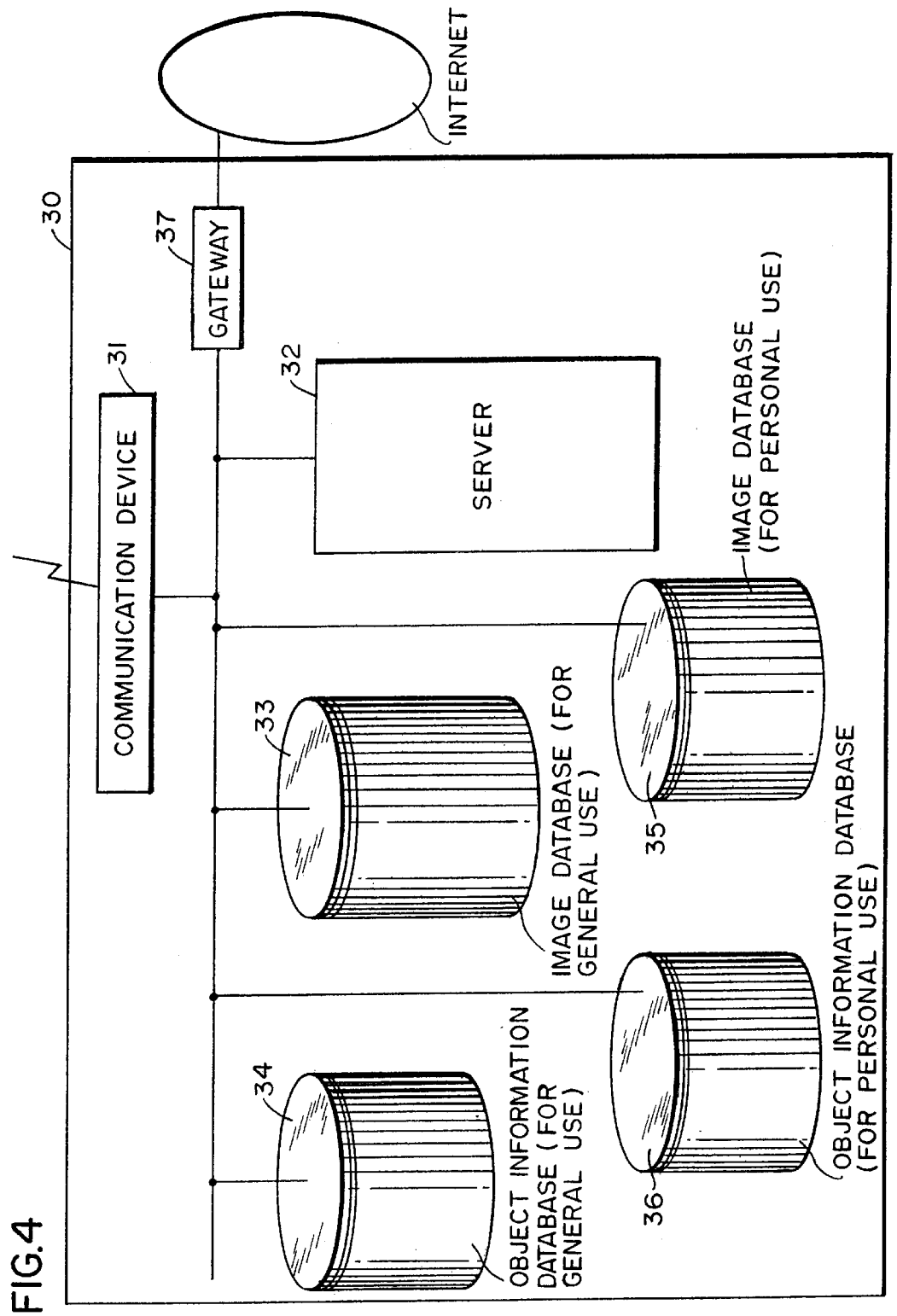
FIG. 4 is a block diagram showing a general configuration of a central system 30.

The central system 30 will be described below. FIG. 4 is a block diagram showing a general configuration of a central system 30. The central system 30 of the present embodiment comprises a communication device 31 for receiving image information and other information from the client apparatus 10 and a server 32 for performing management services such as saving files and controlling inputs, outputs and accesses, as well as transaction processes required for the spatial information processing system of the present embodiment and notifying the client apparatus 10 of the results of the processes. Also included in the central system 30 are databases such as an image database (for general use) 33 for storing image information for general use and an object information database (for general use) 34 for storing information associated with each object (each part) to be provided to the client apparatus 10. In addition, an image database (for personal use) 35 and an object information database (for personal use) 36 are provided as personal databases for the user owning the client apparatus 10. The personal databases allow the user to store the user's own information to which the user wants to add annotation about an object which the user is interested in by associating the information with its image. The central system 30 further comprises a gateway 37 used for accessing an external network (such as the Internet), allowing for accessing the Web server 40 shown in FIG. 1.

A data structure used in the present embodiment is as follows. FIGS. 5a to 5d shows example structures of data sent from the client apparatus 10 to the central system 30. Each of the Figures illustrates the structure of each frame if the data is sent in packet form, for example. FIG. 5a shows the data structure of an object information request. In this figure, positional information obtained through the GPS receiver 22 and information about the direction and position determined by the direction sensor 23 and the angle sensor 24 are shown together with real spatial image information acquired through the camera 12. To send data, information about a data type 101 indicating whether it is a general information request or a general and own information request is required. In addition, measured information such as a position 102, direction 103, and angle 104 as well as a time stamp 105 indicating time at which the event occurred, a user ID 106 for identifying the user, and information about image format 107, such as MPEG2, JPEG, and other compression formats, in which the information is stored. In addition to the management information, real image information 108 is sent.

FIG. 5b shows the data structure of a detailed object information request. The data structure shown is of a request sent from the client apparatus 10 after the client apparatus accesses the central system 30 using the request shown in FIG. 5a and obtains certain information from the central system 30. As with the request in FIG. 5a, the data type 101 and user ID 106 are sent. In this request, an image ID 109 for specifying an image for which the detailed information is sent and information about the cursor position 110 in the image pointed to by the pointing device 15, for example, are indicated. The server 32 of the central system 30, which receives these items of information, can identify what is to be sent and provide the detailed information.

FIG. 5c shows the data structure of an own information store request. This data structure is the same as that shown in FIG. 5a, except that the data type 101 field contains information indicating that the request is an own information request. FIG. 5d shows the data structure of an own information add request. In addition to the information shown in FIG. 5c, an image ID 109 for identifying an image and information about the cursor position 111 in the image is contained. The cursor position 111 information includes stored information consisting of text, audio, and image information. With this information, the user's own information that the user wants to add as annotation can be associated with an object which the user interested in and stored in the image database 35 and object information database 36 in the central system 30 as personal information including audio, text, and image information.

The central system 30, which obtained the information through the data structures in FIGS. 5a and 5c, uses a predetermined pattern matching method to compare the sent image with stored image information. There are a number of pattern matching methods which can be used as this pattern matching method. For example, a statistical identification or structural identification method may be used for the pattern matching. Alternatively, the so-called template matching may be used in which a template, which is a standard pattern provided beforehand, is superimposed and moved over an input image to determine a correlation between the two images in terms of pixel data level correspondence. For an input image, which is sent image information, there is positional information obtained through the GPS receiver 22 and information about the direction and position determined by the direction sensor 23 and angle sensor 24 besides that image information. Selecting a template (video image information) to be compared from the image database (for general use) 33 and image database (for personal user) 35 based on the above-mentioned information before pattern matching can significantly reduce the amount of the process required for the pattern matching. If color information is used effectively in the pattern matching in addition to extracting the outline of an monochrome image binarized, video image information can be extracted more quickly and accurately. For example, whether a sent image information matches stored video image information is determined based on a feature, "yellow", of a building.

FIGS. 6a to 6c show the structures of data sent from the central system 30 to the client apparatus 10. As in FIG. 5, the structure illustrated is that of each frame if the data is sent in packet form. FIG. 6a shows a structure in which a matching image and object information are combined. Here, in addition to data type 121 information, the position 122, direction 123, angle 124, time stamp 125, and user ID 126 are sent based on information sent from the client apparatus 10. Furthermore, a combined image 129, which is a combination of image information and object information, is sent to the client apparatus 10 together with the image ID 127 and image format 128 indicating a format such as a compression format.

FIG. 6b shows a detailed object information response to the detailed object information request sent from the client apparatus 10 shown in FIG. 5b. Here, detailed information (text, audio, Web information) about an object specified by the user with the pointing device 15 is sent together with the data type 121, user ID 126, and image ID 127. The central system 30 obtains the Web information by accessing the Web server 40. An enormous amount of up-to-date information can become available by obtaining such Web information.

FIG. 6c shows a data structure indicating an own information store request acceptance, which is a response to the own information storage request sent from the client apparatus 10. Here, instead of the combined image 129 shown in FIG. 6a, stored image 131 information is sent. Thus, the user operating the client apparatus 10 can see the stored image information and specify a specific object if the user want to further detailed information about the object.

FIGS. 7a and 7b show database structures stored in the image databases 33, 35 and object information databases 34, 36. As shown in FIG. 7a, the position 141, direction 142, angle 143, time stamp 144, and image ID 145 for an image is stored in the image databases 33, 35. In addition, an image 147 is stored together with its image attribute information 146 such as the format, size, and genera/personal. Image information having these data structures obtained from a plurality of client apparatus 10 can be stored in the image database (for general use) 33, and may be stratified and stored based on the position 141 information, for example. In addition to information from the client apparatus 10, other image information created by a predetermined provider, for example, may be stored. In the image database (for personal use) 35, mainly user's own image information shot by the user is stored.

FIG. 7b shows database structure stored in the object information databases 34, 36. Here, besides image ID 151 information, the following one to n items of object information are stored: the object position (1) 152, object ID (1) 153, object position (2) 154, object ID (2) 155, object position (n) 156, and object ID (n) 157. In addition to these object IDs 158, object information 159 including text, audio, image data, and links to Web sites is stored. Thus, objects making up the stored image information can be identified correspondingly to the image databases 33, 35 and the object information 159 can be stored for each of the identified objects.

FIG. 8 shows an example of a combined image actually displayed on the display device 13 of the client apparatus 10. The combined image shown in this example is provided by performing pattern matching in the server 32 of the central system 30 based on image information captured by the client apparatus 10 and sent to the central system 30 and extracting related information, as described earlier, and then sent back to the client apparatus 10. Four types of object information are superimposed over the image information in this example. In this example, "Only this information", "Obtain text information by click", "Obtain audio information by click", and "Obtain Web information by click" are identified by four symbols.

Suppose that a user positioned the cursor on the symbol at company B (B Ltd.), for example, and clicked on it by means of a pointing device 15. The microprocessor 21 recognizes that B Ltd. is selected and sends a packet containing the recognized content having the data structure of a detailed object information request as shown in FIG. 5b to the central system 30 through the communication device 26. The central system 30 stores, based on this packet, Web information relating to B Ltd. in the detailed information 130 field of a detailed object information response as shown in FIG. 6b, then sends it back to the client apparatus 10 in a packet, for example. The user receives this packet and can view the Web information relating to B Ltd. on the display device 13, for example. Similarly, text information about department store X (X Department) and store Y and audio information about store E (7F E store) on the seventh floor of a building can be obtained. Building A (A bld), store Z (3F Z store ) on the third floor of a building, street S, and street N have no additional information.

The user, who obtained the combined information as shown in FIG. 8, can input audio, video, and text information by using the audio input/output device 14, pointing device 15, and text input device 16 about a particular part, indicate that it is personal information, then send the information to the central system 30 to store the landscape information specific to the user, a movable body (person), in the image database (for personal use) 35 and object information database (for personal use) 36 in the central system 30. For example, a sales person may store information about places where he/she called at or his/her customers in the central system 30 together with their images, and access the central system 30 to obtain the information when necessary. Examples of the implementation in which a combined image as shown in FIG. 8 may include the following three implementations. In the first implementation, related information (additional information) is added to image information stored in the image database (for general use) 33 or image database (for personal use) 35 in the central system 30. This implementation is advantageous in that time and effort required for combining can be eliminated. In the second implementation, additional information is added to an image sent from a client apparatus 10 to the central system 30 without making any changes to the image and sent back to the client apparatus 10. This implementation is advantageous in that a natural image information is presented to the user of the client apparatus 10. In the third implementation, a client apparatus 10 holds image information and receives only additional information and information about positions over which the additional information is superimposed from the central system 30. This implementation can reduce the amount of data transmitted.

While the example shown in FIG. 8 is configured to obtain detailed information by specifying an object in a received combined image by using the pointing device 15, complete additional information in text form, for example, can be added to the combined image. In other words, the specification using the pointing device 15 can be eliminated and the procedure can be completed only on the initial combined image received from the central system 30. In this configuration, although information that can be made available is limited, communication time can be reduced to allow the information to be provided faster.

As described above, according to the present embodiment, a movable body (a human user or motor vehicle) carrying a client apparatus 10 comprising a camera 12, which is a small photorecording apparatus, a display device 13, which is a small visual output apparatus (monitor), a GPS receiver 22 and other components first sends landscape information captured through the camera 12, positional information obtained through the GPS receiver, and status information obtained through sensors to a server 32 in a central system 30 over mobile communications in real time. The server 32 receives the information and uses a predetermined pattern matching method to extract image information best matching the landscape information sent from the movable body from image information stored in image databases 33, 35. Then, attribute information (for example, the type of a store or advertisement) linked with objects contained in the image information is retrieved from object information databases 34, 36 and combined with the landscape information into a combined landscape information. The central system 30 sends the combined landscape information to the sending client apparatus 10. The client apparatus 10 displays the received combined landscape information on the display device 13. Thus, the user can obtain additional information about objects right before the user's eyes by comparing the combined landscape information displayed on the display device 13 with its real landscape information.

Furthermore, the user can specify a particular part of the combined landscape information displayed on the display device 13 to obtain further detailed information about the specified part.

Frequently used spatial information may be held in a local storage device and pattern matching may be performed on images in the local storage device. In this configuration, the number of items of image information that undergo pattern matching is limited, thereby allowing information to be provided faster.

In addition, combined landscape information specific to the movable body (human user) can be stored at the central system 30 by specifying a particular part of the landscape information and inputting audio, video, or text information. This facilitates actions performed on spatial information frequently used by the user and allows a personal database, which can be used for personal uses, including hobbies, to be constructed.

Image information sent and received in this embodiment is not limited to a still image, instead, it may be a moving image. A moving image is preferably sampled at certain intervals, rather than simply being transmitted continuously, to extract still images and positional information is added to the still images before transmission. Thus according to the present invention, a user moving in open air can obtain information in real time about an object that the user wants to obtain.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after either or both of the following conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed, is:

1. A spatial information using system comprising a client apparatus carried by a movable body and a central system for providing predetermined information to said client apparatus, wherein:

said client apparatus comprises:
   a photorecording camera apparatus for obtaining image information;
   visual output apparatus;
   a positional information-obtaining device receiver for obtaining positional information about said client apparatus;
said client apparatus sends:
   the image information obtained by said camera;
   the positional information obtained by said positional information-obtaining device;
   status information obtained through sensors;
   to a server in said central system;
   over mobile communications in real time; and
   said server in said central system extracts additional information about an object contained in said image information based on said image information and said positional information received from said client apparatus and sends said additional information to said client apparatus, said extracted additional information further comprising stored image information best matching said received image information from stored information based on said received positional information;
   and said central system detects said additional information based on attribute information linked to said extracted stored image information from a web server connected to a network.

2. A spatial information using system comprising a client apparatus carried by a movable body and a central system for providing predetermined information to said client apparatus, wherein said client apparatus comprises:
   an image information obtaining unit for obtaining image information;
   an additional information generation unit for generating additional information comprising audio information and/or text information to supplement said image information, and a sending unit for sending said image information obtained by said image information obtaining unit and said additional information generated by said additional information generation unit to said central system;

said central system comprises:
a receiving unit for receiving said image information and said additional information sent from said sending unit of said client apparatus; and
a storage unit for storing said image information and said additional information received by said receiving unit;
said storage unit in said central system stores said audio information and/or said text information generated by said additional information generation unit by associating said audio information and/or said text information with said image information.

3. An information obtaining apparatus comprising:
a camera for shooting a landscape to obtain landscape information;
a GPS receiver for identifying the position of said information obtaining apparatus based on a signal obtained from a GPS satellite; and
a communication device for sending said landscape information obtained by said camera and information about the position of said information obtaining apparatus identified by said GPS receiver;
wherein said communication device receives additional information about an object contained in said sent landscape information;
a display device for displaying image information based on said landscape information and said additional information received by said communication device;
a pointing device for selecting particular additional information from said additional information displayed by said display device;
wherein said communication device sends information about said particular additional information selected by said pointing device and receives detailed information about said sent information.

4. An information obtaining apparatus comprising:
a shooting unit for shooting a landscape to obtain landscape information;
a display unit for displaying said landscape information captured by said shooting unit;
a specifying unit for specifying a particular part contained in said landscape information displayed by said display unit;
an additional information input unit for inputting a predetermined additional information for said particular part specified by said specifying unit; and
a sending unit for sending said landscape information captured by said shooting unit and said additional information input by said additional information input means to a server;
and wherein said sending unit sends said landscape information and said additional information to said server with the indication of a request for storing own information.

5. A server system comprising:
a receiving unit for receiving landscape information obtained by a client apparatus from said client apparatus;
wherein said receiving unit receives positional information about said client apparatus at the time when said client apparatus obtains said landscape information and each receiving unit receives specification of said object information sent by said sending unit from said client apparatus;
an image storage unit for pre-storing a plurality of items of image information;
said image storage unit pre-stores said plurality of items of image information identified by a predetermined positional information
an object information storage unit for pre-storing object information which is additional information for an object constituting each of said plurality of items of image information stored in said image storage unit;
an approximate image information selection unit for selecting approximate image information approximating to said landscape, information received by said receiving unit from said plurality of items of image information stored in said image storage unit;
said approximate image information selection unit selects said approximate image information based on said positional information received by said receiving unit; and
a sending unit for reading object information corresponding to said approximate image information selected by said approximate image information selection unit from said object information storage unit and sending said read object information to said client apparatus
wherein said sending unit adds said read object information to said approximate image information selected by said approximate image information selection unit and sends said approximate image information and said read object information to said client apparatus, and said sending unit sends said read object information to said client apparatus by associating said object information with the position of an object constituting said approximate image information, and said sending unit sends detailed information about said object information specified through said receiving unit to said client apparatus and;
a Web server access unit for receiving additional information or detailed information corresponding to an object constituting said approximate image information from a Web server via a network.

6. A server system comprising
a receiving unit for receiving landscape information and positional information obtained by a client apparatus and additional information about a part constituting said Landscape information from said client apparatus;
an image storage unit for storing said landscape information received by said receiving unit and for storing positional information received by said receiving unit; and
an object information storage unit for storing said additional information received by said receiving unit by retaining a correspondence between said additional information and said landscape information stored by said image storage unit,
wherein said receiving unit receives positional information about said landscape information; and
said image storage unit stores said landscape information together with said positional information received by said receiving unit.

7. An information obtaining apparatus comprising:
an image information capturing unit for shooting a landscape to capture image information;
a positional information identifying unit for identifying the position of said information obtaining apparatus at the time when shooting is performed by said image information capturing unit;

a sending unit for sending said image information captured by said image information capturing unit and information about said position identified by said positional information identifying unit to a server;

a receiving unit for receiving, from said server, additional information about a predetermined object contained in the landscape captured by said image information capturing unit; and an output unit for outputting said additional information received by said receiving unit;

a detection unit for detecting the direction and/or angle at which said image information capturing unit is aimed when shooting is performed by said image information capturing unit; wherein said sending unit sends information about said direction and/or angle detected by said detection unit and wherein said receiving unit receives said additional information together with predetermined image information to which said additional information is added.

a display unit for displaying said predetermined image and said additional information received by said receiving unit; and a selection unit for selecting particular additional information from said additional information displayed on said display unit;

wherein said sending unit sends information about said particular additional information selected by said selections unit to said server and said receiving unit receives detailed information about said particular additional information from said server.

* * * * *